United States Patent [19]

Zook

[11] Patent Number: 5,094,874
[45] Date of Patent: Mar. 10, 1992

[54] PROCESS FOR INFUSION OF PARTIALLY-DEFATTED NUTS

[75] Inventor: Denise Zook, Madison, N.J.

[73] Assignee: Nabisco Brands, Inc., Parsippany, N.J.

[21] Appl. No.: 674,856

[22] Filed: Mar. 25, 1991

[51] Int. Cl.$^5$ ................................................. A23L 1/36
[52] U.S. Cl. ...................................... 426/632; 426/93; 426/601; 426/611
[58] Field of Search .................. 426/632, 93, 601, 611

[56] References Cited

U.S. PATENT DOCUMENTS

| | | | |
|---|---|---|---|
| 3,294,549 | 2/1966 | Vix et al. | 426/632 |
| 3,457,087 | 7/1969 | Renner | 426/632 |
| 3,645,752 | 2/1972 | Baxley | 426/632 |
| 3,740,236 | 6/1973 | Baxley | 426/270 |
| 4,049,833 | 9/1977 | Gannis et al. | 426/632 |
| 4,206,246 | 6/1980 | Mamahit | 426/632 |
| 4,329,375 | 5/1982 | Holloway, Jr. et al. | 426/632 |
| 4,364,967 | 12/1982 | Black | 426/632 |
| 4,466,987 | 8/1984 | Wilkins et al. | 426/632 |
| 4,504,513 | 3/1985 | Black | 426/632 |
| 4,938,987 | 7/1990 | Gannis et al. | 426/632 |
| 5,002,802 | 3/1991 | Gannis et al. | 426/632 |

*Primary Examiner*—Donald E. Czaja
*Assistant Examiner*—Helen Pratt

[57] ABSTRACT

The present invention relates to flavorful partially-defatted nuts and a process of preparing them by infusing the nuts with an edible oil. This process makes it possible to produce partially-defatted nuts having both an improved flavor and a low caloric content.

21 Claims, No Drawings

PROCESS FOR INFUSION OF PARTIALLY-DEFATTED NUTS

BACKGROUND OF THE INVENTION

The application of a flavoring agent to nuts has long been known in the art. For instance, U.S. Pat. No. 3,457,087 to Renner discloses a process for eliminating surface blemishes from peanuts by heating them to a temperature above the boiling point of water and then quenching in an oil bath which may contain various flavors and aroma-producing compounds. In U.S. Pat. No. 4,206,246 to Mamahit, peanuts are immersed in a boiling brine which may contain various flavorings to produce a flavored nut-meat.

The prior art also recognizes that when nuts are defatted, the loss of oil diminishes their flavor. For example, U.S. Pat. No. 3,740,236 to Baxley indicates that roasted peanut flavor appears to be reduced in proportion to the percentage of the peanut oil removed during the pressing process.

Although the exact reason for the flavor loss in partially-defatted nuts is not fully understood, the doctoral dissertation of M.E. Mason, entitled "Procedures in Studying and Factors Influencing the Quality and Flavor of Roasted Peanuts", Oklahoma State University, 1963, pages 63 and 64, indicates that oil pressed from peanuts contains aleurone grains, among other particulates, which appear to contain flavor precursors. The Mason dissertation, however, was not concerned with preparing low-fat nuts, but simply with gaining a better knowledge of the source and identification of flavor principles in peanuts.

In U.S. Pat. No. 4,049,833 to Gannis et al., partially-defatted nuts are reconstituted in a glycerol solution at elevated temperatures. The glycerol solution may have various flavorings and colorants incorporated in it. U.S. Pat. No. 3,645,752 to Baxley discloses a process which comprises mechanically pressing nuts to partially defat them, oil-roasting the nuts, and quenching the hot nuts in a bath of a high stability oil which may contain various flavors.

Likewise, U.S. Pat. Nos. 4,364,967 and 4,504,513 to Black disclose a process comprising mechanically pressing peanuts, simultaneously reconstituting and roasting the peanuts in an oil bath, and quenching the hot peanuts in a second oil bath of a high stability oil which may contain flavor impregnants. The resulting peanuts are then milled into a paste for use as a chocolate extender. Vix et al., in a similar process disclosed in U.S. Pat. No. 3,294,549, dry and roast defatted, reconstituted nuts in a hot oil bath.

The problem, however, with all these processes is that quenching of hot partially-defatted nuts or otherwise placing the nuts in an oil bath adversely increases the oil content and caloric content of the partially defatted nuts. As a result, the full, low calorie benefit of partially-defatted nuts cannot be realized.

SUMMARY OF THE INVENTION

The present invention relates to a process of preparing flavorful, partially-defatted nuts by infusing them with an edible oil.

In its most comprehensive form, the process of the present invention first involves pressing raw nuts so that they are partially defatted. The partially-defatted nuts are then either dry or oil roasted and contacted with an edible oil under conditions which improve the flavor of the nuts by infusion while maintaining a low fat content. The nuts are then cooled. Optionally, after infusion and roasting, the nuts can be coated with powdered flavoring agents, texturizers, binders, sweeteners, or mixtures thereof.

DETAILED DESCRIPTION OF THE INVENTION

The process of the present invention relates to the infusion of partially-defatted nuts with an edible oil.

The term "nut" as used in this description includes whole nuts and pieces of nuts such as peanuts, almonds, Brazil nuts, filberts, pecans, walnuts, and the like. For purposes of conciseness this description will center around the production of partially-defatted nuts, especially peanuts, having improved flavor. It is not intended, however, to be limited to peanuts or nuts generally because the principles will also apply to other products possessing semi-rigid and non-porous textures, such as soybeans, garbanzo beans, peas, etc.

In practicing this invention, partially-defatted nuts are prepared by removing some or all of the oil contained in the nuts. For example, oil can be removed from the nuts by mechanically pressing them under conditions effective to at least partially remove the oil from the nuts.

Preferred processes for defatting nuts are taught in U.S. Pat. No. 4,329,375 to Holloway, Jr., et al. and U.S. Pat. No. 4,466,987 to Wilkins et al., the disclosures of which are incorporated herein by reference. Generally, such processes remove about 40% to about 52% of the oil in nuts which may be blanched or unblanched and raw or roasted, with equivalent results.

An exemplary method for removing oil from the nuts is disclosed in U.S. Pat. No. 4,938,987 to Gannis et al., the disclosure of which is incorporated herein by reference. The process disclosed in this patent comprises mechanically pressing raw nuts to extract about 40% to about 52% of their initial oil content. This can be achieved, for example, by employing a Carver Press at applied pressures of greater than about 1,000 pounds/-square inch (psi) for about 15 to about 120 minutes.

The exact times and pressures for oil extraction can be varied to obtain the desired degree and rate of extraction, but pressures of no greater than about 1,500 psi, particularly about 1,100 to about 1,300 psi, are preferred. Although pressures above this range will extract oil more rapidly, more physical damage to the nuts and possibly a reduction in the amount of retained natural flavors can occur. Pressures below the disclosed range can be employed with somewhat less nut breakage, but the time required for extraction of the desired amount of oil will increase.

By utilizing the above-described pressing conditions, a desirable balance between calorie reduction and final product flavor and texture can be achieved with oil reduction of between about 40% and about 52%. Preferably, pressure is elevated to the desired level as quickly as possible.

After pressing, the nuts are flat and undesirably dense. It is, therefore, appropriate to expand (or reconstitute) the nuts to bulk densities which approximate those of full fat nuts. Such bulk densities will generally approach about 0.40 grams per cubic centimeter (g/cc) (determined, for instance, by filling a 500 cubic centimeter graduated cylinder with nuts, determining the weight of the nuts, and dividing the weight in grams by the volume in cubic centimeters). Preferably, the bulk density of the reconstituted nuts is within the range of about 0.32 to about 0.39 g/cc.

Expansion can be effected by contacting the defatted nuts with sufficient water to reconstitute them when subsequently roasted. Such contact is preferably at a level of about 3 to about 7, more preferably about 4, pounds of water per hundred pounds of nuts. The water and nuts may be contacted in any suitable mixing device such as a rotatable coating drum.

Alternatively, the nuts can be reconstituted using steam. Although pressurized steam can be employed for reconstitution, steam at atmospheric pressure has been found to be effective and is preferred. The use of steam or pressurized steam may have economic disadvantages when compared with merely contacting the nuts with water, because of the additional capital outlay, etc., however, it has been found that nuts reconstituted in this manner exhibit superior texture and flavor after roasting. The exact reason for this is unknown, but it is believed steam or pressurized steam reconstitution opens the pores of the nuts more effectively, which leads to the observed improvements on roasting. These improvements justify the additional capital outlay, etc. involved with steam-mediated reconstitution.

When steam or pressurized steam is used to reconstitute the nuts, the nuts are contacted with the steam in a suitable vessel, such as a rotatable coating drum when steam at atmospheric pressure is used, or a pressure cooker or steam chamber when pressurized steam is used. Contact with the steam should continue for a time sufficient to achieve satisfactory reconstitution. Advantageously, steam reconstitution proceeds for about 30 seconds to about five minutes, more preferably about 45 seconds to about four minutes, to ensure a desirable level of reconstitution.

After reconstitution, the nuts are roasted and contacted with an edible oil. The particular order in which these operations is effected depends on whether the nuts are dry roasted, which will be understood to include any process involving roasting in the substantial absence of added oil (i.e., less than about 10% by weight), such as air roasting and granular roasting, or whether they are oil roasted. When the nuts are dry roasted, roasting is followed by contact with an edible oil. When oil roasted, contact with an edible oil occurs prior to or simultaneously with roasting.

The partially defatted nuts are dry roasted in any suitable manner that gives them the characteristic taste and texture of roasted nuts. Typically, the nuts are roasted to a moisture content of less than about 3%, preferably less than about 2%, and most preferably about 1.5% or less. The degree to which the nuts are roasted should correspond to an Agtron color photometer reading of about 60 to about 95 in the green mode with 12% and 33% plates defining the reading scale. Most preferably, the reading will be within the range of about 80 to about 90.

In air roasting, the nuts are roasted in a stream of hot air at a temperature of about 275° F. to about 400° F., advantageously about 320° F. to about 335° F. Roasting times and temperatures can be varied depending upon the particular type of nut being processed, as well as the roasting temperature and degree of roasting desired. Illustratively, the time and extent of roasting will be greater for peanuts (i.e., about 10 minutes to about 30 minutes) than for cashews (i.e., about 3 minutes to about 15 minutes). The most appropriate conditions to be adopted in any particular instance can be readily determined by the skilled artisan.

In granular roasting, the nuts are contacted with a finely divided heat transfer media which is heated to a temperature of about 315° F. to about 465° F., preferably about 380° F. to about 410° F. Roasting times and temperatures will vary depending upon the particular type of nut being processed and the degree of roasting desired. Illustratively, the time and extend of roasting will be greater in the case of peanuts (i.e., about 1 minute to about 9 minutes) than in the case of cashews (i.e., about 30 seconds to about 3 minutes).

The finely divided heat transfer vehicle useful in the practice of this invention can be any suitable finely divided material which will absorb heat from a heat source, such as a flame, and transfer the heat to the nuts upon contact. Preferably, the finely divided heat transfer vehicle can be salt, ceramic beads, sand, or metal balls, and is most preferably ceramic beads.

After dry roasting, the nuts are infused with an edible oil by contacting therewith under suitable conditions. The edible oil can be any conventional vegetable oil utilized in foods, including coconut, nut, sesame, cottonseed, corn, or palm oil, which may be partially or wholly hydrogenated. Advantageously, a nut oil derived from the same type of nut as the partially-defatted nut of this invention is utilized.

For instance, if the partially-defatted nut is a peanut, the oil is peanut oil. However, it is not necessary to use oil from the same sub-type of nut as the partially-defatted nut. For example, if the partially-defatted nut is a Jumbo Runner peanut, it is not necessary to use the oil from Jumbo Runner peanuts. In fact, superior results can be achieved when partially-defatted Jumbo Runner peanuts are infused with oil extracted from Spanish peanuts.

Advantageously, the edible oil contains a flavoring agent which is incorporated into the nuts. Suitable flavoring agents include nut flavor concentrates which are naturally present in nuts or nut oil. Such materials can be obtained by a variety of conventional techniques (e.g., dark roasting nuts and then extracting the nut oil). These nut flavor concentrates can be recovered from nuts which are either the same as or different from the partially-defatted nut being infused.

Other flavoring agents include: fruit flavors; chocolate or other confectionery flavors; mint flavor; honey flavor, the flavor of alcoholic beverages such as beer, wine, and whiskey; and other desired artificial or natural flavor, and mixtures thereof.

In addition, the flavoring agents can be encapsulated by known techniques for a superior flavor note. Moreover, encapsulation will also serve to protect flavoring agents which may be sensitive to handling or otherwise subject to degradation during the infusion operation or storage of the resulting nuts. Such agents include artificial sweeteners, such as aspartame, and fat soluble vitamins, such as vitamins A, D, and E.

Additionally, other desired additives such as texturizers may be included in the edible oil infusion. Suitable texturizers include fiber, especially pea fiber, bulking agents such as methylcellulose, and corn syrup solids. These texturizers assist in the formation of a finished product having a texture and color more nearly that of full-fat nuts.

Desirably, the edible oil infused into the nuts is at least partially hydrogenated. Hydrogenation of the infusion oil leads to a finished product having an improved texture, which more closely approximates that of full-fat nuts. Preferably, the edible oil is hydrogenated so as to have a melting temperature of no lower than about 90° F., more preferably no lower than about 105° F. The most preferred melting temperature of the hydrogenated oil is between about 110° F. and about 120° F. In this way, the oil is liquid during the infusion operation, as discussed below, but solid at the temperatures to which the finished product are normally exposed.

It has been found that improved flavor of the finished product can be obtained when the edible oil infused into the nuts is oil in which nuts have previously been roasted. Although not fully understood, it is believed that roasting oils take up flavor components of the material being roasted therein. Accordingly, these flavor components can be transferred to the nuts in which the oil is infused.

The roasting oil can be taken from the roasting of any material whose flavoring components are desired to be imparted to the nuts. Suitably, the oil is taken from the roasting of nuts, preferably the same type of nut as being infused. It is not necessary, though, to use oil used to roast the same sub-type of nut as being infused.

The oil infusion step is distinguishable from prior art oil quenching operations by virtue of the weight ratio of oil in contact with the nuts. When quenching, the nuts are immersed in a bath, causing the nuts to return to approximately a full fat level (i.e., about 55 weight %). By contrast, in the oil contacting step of the present invention, a large amount by weight of nuts is contacted with a relatively small quantity of oil. As a result, only that limited quantity of oil is capable of being infused into the nuts, maintaining a low calorie content. The quantity of oil utilized is about 3 to about 15, preferably about 10, pounds of oil per 100 pounds of nuts which will return the fat content of the nuts to about 33% to about 40% by weight.

In the infusion operation, both the nuts and the oil can be at relatively high temperatures, i.e., about 180° F. to about 320° F. Preferably, the nuts are at a temperature of about 200° F. to about 300° F., most preferably about 270° F. to about 300° F. The edible oil is preferably at a temperature of about 240° F. to about 320° F. for effective infusion. It is desirable, but not critical, that both the nuts and the oil are at approximately the same temperature. An acceptable product is produced when the oil is at a lower temperature than the nuts or the nuts are at a lower temperature than the oil, although the latter situation may be less preferred.

When both the nuts and the oil are at relatively low temperatures, i.e., about 180° F. to about 200° F., contacting the nuts with the edible oil may cause the oil to solidify on the surface of the nuts (depending on the melting temperature of the oil). When this occurs, the nuts can be warmed to a temperature sufficient to melt the oil (usually 220° F. is sufficient) which will cause the oil to infuse into the nuts.

It will be understood that, when the nuts are dry roasted prior to infusion, and when the infusion oil is taken from a prior roasting operation, the nuts and oil can be maintained at the temperatures of the respective roasting operations.

The edible oil and any other additives are mixed in a suitable vessel by conventional means. Infusion can then be effected by any conventional technique. For example, spraying a controlled amount of oil onto moving nuts in a continuous coating drum for a period of time sufficient to allow infusion of edible oil and any additives to a level of about 2% to about 10% by weight of the nuts. Typically, infusion is carried out for about one minute to about five minutes, more preferably about two minutes to about four minutes.

When oil roasting is desired, infusion of the partially defatted nuts with an edible oil is advantageously effected prior to or during roasting. The infusion is performed by contacting the nuts with an edible oil as described above.

When oil roasting, typically, the nuts are roasted in an edible oil such as refined peanut oil at a temperature in the range of about 300° F. to about 330° F., preferably from about 315° F. to about 325° F., and for a time which will vary depending upon the particular type of nut being processed and upon the temperature of roasting and the degree of roasting desired. Illustratively, the time and extend of roasting will be greater in the case of peanuts (from about 4.5 to about 7 minutes) than in the case of cashews (from about 1.5 to about 3.5 minutes). The most appropriate roasting conditions to be adopted in any particular instance can be determined readily by the skilled artisan.

After infusion and roasting, the nuts can be coated with various powdered flavoring agents such as allspice, cinnamon, clove, caraway, bay, sage, ginger, basil, and the like. These materials can be employed alone or with condiments such as salt, pepper, monosodium glutamate, and the like. In addition, texturizers such as glycerine and polyproplyene glycol and binders such as natural gums, dextrins, gelatin, sugars, and the like.

After the nuts have been defatted, roasted, and infused (and coated, if desired), they are preferably cooled and packaged. In fact, the reduced calorie, infused nuts of the present invention can be packaged with full-fat nuts to provide a package of nuts having an overall reduction of fat and calories when compared with a package containing only full-fat nuts. For instance, it is anticipated that a blend comprising about 60% of the low fat nuts prepared by the process disclosed herein and about 40% of full-fat nuts will result in a net decrease in calories of between about 8% and about 15%, and a net decrease in fat of between about 15% and about 25%.

In addition, when low fat nuts are packaged with full-fat nuts in this manner, flavor and texture improvements in the low fat nuts are detected. Although the reason for this is not fully understood, it is believed that gas exchange between the nuts takes place in the package, leading to the observed flavor and textural improvements. Moreover, the combination of low-fat and full-fat nuts in the same package may lead to interesting, textural mouthfeel sensations for the consumer.

The following example is presented to further illustrate and explain the present invention and should not be viewed as limiting in any regard. Unless otherwise indicated, all parts and percentages are by weight, and are based on the total weight of the product at that particular stage in processing.

EXAMPLE

Pressed, partially defatted Virginia Runner peanuts (100 lbs), from which about 50% of the fat has been removed, are reconstituted using steam at atmospheric pressure for one minute. The reconstituted nuts are then roasted in hot air at 300° F. for 25 minutes. The roasted nuts are then separated into individual groups and contacted with 4% by weight of partially hydrogenated peanut oil having an iodine value of 31.7 and trans isomers of 24.7% to effect infusion. The nuts and oil were at the temperatures detailed in Table 1.

TABLE I

| Temperature of Oil (°F.) | Temperature of Nuts (°F.) |
|---|---|
| 320 | 300 |
| 320 | 200 |
| 300 | 280 |
| 300 | 200 |
| 280 | 260 |
| 280 | 200 |
| 260 | 240 |
| 260 | 200 |
| 240 | 300 |
| 240 | 220 |
| 220 | 300 |
| 220 | 200 |
| 200 | 300 |
| 180* | 200 |
| 180* | 195 |
| 180* | 190 |
| 180* | 185 |
| 180* | 180 |

*Nuts were warmed in oven after contact to effect infusion.

All of the resulting nuts were found to exhibit a texture, flavor, and mouthfeel approximating that of full-fat nuts.

The above description is presented for the purpose of teaching the person of ordinary skill in the art how to make and use the invention. It is not intended to detail all those obvious modifications and variations of the invention which will become apparent to the skilled worker upon reading the description. It is intended, however, that all such obvious modifications and variations be included within the scope of the invention which is defined by the following claims.

What is claimed is:

1. A process for producing flavorful low fat nuts comprising:
    removing at least some of the oil from raw nuts so that they are partially defatted;
    roasting the partially defatted nuts substantially in the absence of added oil; and
    infusing the roasted, partially defatted nuts while at a temperature between about 180° F. and about 320° F. with an edible oil which is at a temperature between about 180° F. and about 320° F. at a level of about 5 to about 15 pounds of oil per 100 pounds of nuts to produce low fat nuts with an oil content of about 33% to about 45% and an improved flavor.

2. The process of claim 1, wherein said nuts are selected from the group consisting of peanuts, almonds, Brazil nuts, filberts, pecans, walnuts, and mixtures thereof.

3. The process of claim 1, wherein said edible oil contains a flavoring agent.

4. The process of claim 1, wherein said edible oil comprises oil previously used to roast nuts.

5. A process according to claim 1, wherein said infusion occurs while said nuts are at a temperature between about 270° F. and about 300° F. and said oil is at a temperature between about 240° F. and about 320° F.

6. The process of claim 1, wherein oil is removed from said nuts by pressing to reduce the oil content of the raw nuts by about 40% to about 52%.

7. The process of claim 1, wherein said nuts are roasted with hot air at a temperature of about 275° F. to about 400° F.

8. The process of claim 1, wherein said nuts are roasted by contacting them with a finely divided heat transfer media at a temperature of about 315° F. to about 465° F.

9. The process of claim 6, which further comprises reconstituting said nuts after pressing by contacting them with water at a level of 3 to 7 pounds of water per hundred pounds of nuts.

10. The process of claim 6, which further comprises reconstituting said nuts after pressing by contacting them with steam or pressurized steam for about 30 seconds to about three minutes.

11. A process for producing flavorful low fat nuts comprising:
    removing at least some of the oil from raw nuts so that they are partially defatted;
    infusing said partially defatted nuts while at a temperature between about 180° F. and about 320° F. with an edible oil which is at a temperature between about 180° F. and about 320° F. at a level of about 5 to about 15 pounds of oil per 100 pounds of nuts, to produce low fat nuts with an oil content of about 33% to about 45% and an improved flavor; and
    roasting said nuts in oil.

12. The process of claim 11, wherein said nuts are selected from the group consisting of peanuts, almonds, Brazil nuts, filberts, pecans, walnuts, and mixtures thereof.

13. The process of claim 11, wherein said edible oil contains a flavoring agent.

14. The process of claim 11, wherein said edible oil comprises oil previously used to roast nuts.

15. A process according to claim 11, wherein said infusion occurs while said nuts are at a temperature between about 270° F. and about 300° F. and said oil is at a temperature between about 240° F. and about 320° F.

16. The process of claim 11, wherein oil is removed from said nuts by pressing to reduce the oil content of the raw nuts by about 40% to about 52%.

17. The process of claim 11, wherein said nuts are roasted in an edible oil at a temperature of about 300° F. to about 330° F.

18. The process of claim 16, which further comprises reconstituting said nuts after pressing by contacting them with water at a level of 3 to 7 pounds of water per hundred pounds of nuts.

19. The process of claim 16, which further comprises reconstituting said nuts after pressing by contacting with steam or pressurized steam for about 30 seconds to about three minutes.

20. The process of claim 1, wherein said nuts are packaged with full-fat nuts.

21. The process of claim 11, wherein said nuts are packaged with full-fat nuts.

* * * * *